United States Patent Office 2,875,252
Patented Feb. 24, 1959

2,875,252

PREPARATION OF ACETONE KETALS

Edward U. Elam and Robert H. Hasek, Kingsport, Tenn., assignors to Eastman Kodak Company, Rochester, N. Y., a corporation of New Jersey No Drawing. Application July 18, 1957
Serial No. 672,585

5 Claims. (Cl. 260—615)

This invention concerns a method for preparing ketals, and more particularly, to a method for preparing acetone ketals.

Acetone ketals can be utilized as intermediates for the preparation of many useful compounds. Allyl isopropenyl ether, which can be prepared from acetone diallyl acetal, is the starting point for the preparation of synthetic pyrethrin, a valuable insecticide. Acetone diethyl acetal is useful as a dehydrating agent for heat-sensitive compounds. In addition, acetone ketals can be decomposed by heating at high temperatures with acids to give substituted vinyl ethers which can be polymerized by known techniques to give useful resins. Also, the present acetone acetals can be used as solvents and plasticizers. Hence, acetone ketals are valuable commercial chemicals.

Ketals have been prepared by reacting ketones with esters of orthoformic or orthosilicic acid. However, orthoformates and orthosilicates are expensive and not available on a large scale. Acetone ketals have been prepared by the reaction on alcohols with isopropenyl acetate and by the addition of alcohols to an acetylenic compound. However, isopropenyl acetate is relatively expensive as are acetylenic compounds. The reaction of acetone with alcohols, especially with alcohols of higher molecular weight than methanol, does not give a satisfactory yield of acetals. The prior art methods described above for preparing acetone ketals are either expensive, low yielding or cumbersome to use commercially.

It is an object of the invention to provide a new method for preparing acetone ketals.

It is another object of the invention to provide a novel process for preparing acetone ketals from readily available starting materials.

It is a further object of the invention to prepare acetone ketals by a new process which does not necessitate the use of acetylenic compounds, orthoformates, orthosilicates or isopropenyl acetate.

It is also an object of the invention to synthesize in good yields by a new process acetals having the formula

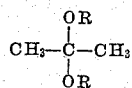

wherein R is an aliphatic radical having 1–10 carbon atoms.

These and other objects of the invention are accomplished by reacting allene with an aliphatic monohydric alcohol in the presence of a catalytic amount of a catalyst composed of an acidic material and a mercuric compound. The present process can be represented by the following equation:

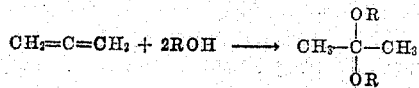

wherein R is an aliphatic radical having 1–10 carbon atoms.

Allene is a gaseous by-product resulting from the manufacture of acetic anhydride and is available in sizable quantities at a relatively low cost. Allene is also commonly called "propadiene" and "dimethylenemethane."

The alcohol employed in the present process can be any aliphatic monohydric alcohol having 1–10 carbon atoms. Either primary, secondary or tertiary alcohols can be employed. Lower aliphatic monohydric alcohols having 1–4 carbon atoms are more desirably used, with the lower alkyl alcohols being preferably used. Suitable alcohols that can be utilized in the present process include: Methanol, ethanol, n-propanol, isopropanol, allyl alcohol, n-butanol, isobutanol, 1-pentanol, 2-pentanol, 2-methyl-2-butanol, 1-hexanol, 2-ethylhexanol, 1-heptanol, 1-octanol, amyldiethylcarbinol, 1-nonanol, 1-decanol, 4-decanol, and the like. In general, the lower primary alcohols such as methanol and ethanol require relatively milder reaction conditions in the present process than do higher molecular weight alcohols are secondary and tertiary alcohols.

The catalyst utilized in the instant process is composed of an acidic material and a mercuric compound. The acidic material can be a Lewis acid such as a boron fluoride, zinc chloride, stannic chloride and aluminum chloride, or related Lewis acids; and mineral acids such as sulfuric acid, hydrochloric acid and phosphoric acid, and the like. Complexes formed with boron trifluoride and an oxygenated organic compound such as an ether, alcohol, carboxylic acid or ketone are preferably used. Suitable boron fluoride complexes that can be used are materials having the following formulas:

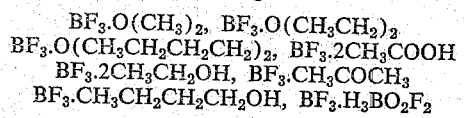

and related boron fluorides. A mercuric compound is also used in combination with the acidic material as the present catalyst material. Such inorganic mercuric compounds as mercuric oxide, mercuric chloride, mercuric sulfate or the like are satisfactory components of the present catalyst material. To increase the rate of reaction of the less reactive alcohols, a small amount of trichloroacetic acid can be added to the aforementioned catalysts. In a preferred embodiment of the invention, mercuric oxide and a boron fluoride are employed, these two materials forming in situ a particularly effective catalytic combination. The amount of catalyst combination employed in the present process can be varied widely, although at least 0.1%, and usually not more than 10%, based on the weight of the alcohol reactant is more generally used.

Allene reacts with alcohols in the presence of alkaline catalysts to form isopropenyl ethers by the addition of one molar proportion of alcohol to the allene. We have now found that two molar proportions of alcohol can be added to allene to form the present useful acetone ketals by employing the catalysts described above, these catalysts being acidic in nature.

The temperature of the present reaction can be broadly varied. Methanol and allene in the presence of a boron trifluoride etherate-mercuric oxide catalyst, for example, readily react at room temperature. Higher molecular weight alcohols than methanol react more slowly with allene, and thus, slightly elevated temperatures are preferably employed. Extremely high reaction temperatures are not desirably employed as such by-products as unsaturated ethers tend to form. In general, the present process is operative from about —30° C. to 150° C., with the preferred operating temperature range being from about 0° C. to 75° C. Temperatures of from about 20° C. to 60° C. are more generally used for reacting allene and lower alkyl alcohols.

In carrying out the present process, the alcohol is placed in a reactor and the allene is added to the alcohol, preferably by passing a gaseous stream of the allene into the reaction vessel containing the alcohol with agitation or stirring. The reaction of allene with such lower molecular weight alcohols as methanol and butanol is exothermic and requires no external heating. External cooling is often times desirably employed to maintain the temperature of the reaction mixture within the preferred temperature range described above. The temperature of the reaction mixture can also be regulated by carefully controlling the input of allene to the reactor. The reaction is conveniently effected under atmospheric pressure, although higher pressures or even sub-atmospheric pressures can be utilized. The reaction is continued until a substantial proportion of allene has reacted with the alcohol, the reaction time varying with the rate of addition of the allene, the temperature of the reaction, the type of catalyst and the relative reactiveness of the particular alcohol. When the reaction is completed, or if it is desired to stop the reaction, an alkaline material such as sodium carbonate, potassium carbonate, sodium methoxide, or a related alkaline material, is added to the reaction mixture to neutralize the acidic reaction medium. Unreacted or excess alcohol can then be distilled off to be utilized in subsequent reactions, and thereafter a fraction containing the acetone ketal reaction product can be distilled off.

The invention is illustrated by the following examples of preferred embodiments thereof.

*Example 1*

A mixture of 15 g. of red mercuric oxide, 6 ml. of boron trifluoride ethyl etherate, and 6 ml. of methanol was placed in a 500 ml. three-necked flask and warmed momentarily over a flame. The flask was then fitted with a magnetic stirrer, a gas inlet, a thermometer, and a gas outlet which led to a Dry Ice trap and then to the atmosphere. A 192 g. portion of methanol was added to the flask reactor. The contents in the reactor were vigorously stirred while a stream of allene was passed into the reaction flask. The rate of addition of allene was regulated so that substantially no allene escaped and condensed in the Dry Ice trap. The reaction temperature rose rapidly and was held at about 40° C. by external cooling. About 109 g. of allene were added to the reaction mixture over a period of one hour, after which time the reaction rate dropped sharply. The resulting mixture was stirred at room temperature for two more hours, and thereafter neutralized wtih 15 g. of anhydrous potassium carbonate. The neutralized reaction mixture was filtered and distilled at a pressure of 178 mm. of mercury. The distillate fraction which boiled below 40° C. was treated with anhydrous potassium carbonate and fractionated at atmospheric pressure through an approximately 3 foot by 1.5 inch column packed with "Penn State" packing. The following fractions were collected: 5 ml. at 26–40° C.; 19 ml. at 40–55° C. having $n_D^{20}$ 1.3610; 170 ml. at 59–65° C. having $n_D^{20}$ 1.3619; 5 ml. at 69–75° C.; and 94.3 g. at 75–80° C. having $n_D^{20}$ 1.3771. The only remaining residue was still hold-up. The fractions boiling from 40–65° C. were combined and diluted with 50 ml. of water and extracted several times with diethyl ether. The resulting extract was dried over potassium carbonate and distilled through the column described above to give 60 g. of acetone dimethyl acetal having $n_D^{20}$ 1.3778 and boiling at 75–80° C. Combining this 60 g. fraction with the 94.3 g. fraction separated at 75–80° C. described above, resulted in 154.3 g. of acetone dimethyl acetal product for a yield of 53% based on the allene reactant. Based on the empirical formula for acetone dimethyl acetal ($C_5H_{13}O_2$), a carbon-hydrogen analysis should theoretically show 57.6% carbon and 11.59% hydrogen. Samples of the distilled produce were found to contain 57.56% carbon, and 11.72% hydrogen.

*Example 2*

A mixture of 10 g. red mercuric oxide, 4 ml. of boron trifluoride ethyl etherate, and 4 ml. of methanol were heated momentarily in a 500 ml. three-necked flask equipped as described in Example 1. A 250 g. sample of n-butanol was added to the flask. The contents of the flask were stirred vigorously while a stream of allene was passed in. The reaction temperature rose rapidly without external heating to a temperature of 50–60° C. The reaction mixture was held at 50–60° C. by controlling the rate of addition of allene. A total of 20 g. of allene was taken up in the reaction mixture in about an hour, substantially none of the allene passing through the system to the Dry Ice trap. The allene feed into the reaction zone was stopped and the solution was stirred while the temperature fell to 33° C. A solution of sodium methoxide prepared from 3 g. of sodium and a small portion of methanol was used to neutralize the reaction mixture. The resulting mixture was then filtered and distilled at a pressure of 25 mm. of mercury. Excess n-butanol was distilled off and a 40.4 g. fraction of the acetone di-n-butyl acetal product was thereafter distilled off at 90–93° C. (25 mm.) for a yield of 42.5% based on the allene. The acetone di-n-butyl acetal had $n_D^{20}$ 1.4126. Based on the empirical formula for acetone di-n-butyl acetal ($C_{11}H_{24}O_2$) a carbon-hydrogen analysis should theoretically show approximately 70.2% carbon and 12.8% hydrogen. Samples of the distilled product were found to contain 70.2% carbon and 12.98% hydrogen.

The present process utilizes allene, a readily available by-product of the manufacture of acetic anhydride, to prepare acetone ketals. Hence, such expensive and often times difficult to obtain chemicals as certain acetylenic materials, orthoformates, orthosilicates and isopropenyl acetate, which are employed in prior art methods for preparing ketals, are not used in the present process. Further, the present process is relatively simple to effect, as well as being relatively high yielding. Accordingly, the instant invention provides a particularly desirable method for preparing acetone ketals.

Although the invention has been described in considerable detail with reference to certain preferred embodiments thereof, it will be understood that variations and modifications can be effected within the spirit and scope of the invention as described hereinabove and as defined in the appended claims.

We claim:

1. The process for preparing acetone ketals which comprises reacting allene with an alkyl monohydric alcohol having 1–10 carbon atoms in the presence of a catalyst comprised of a Lewis acid and an inorganic mercuric compound at a temperature of about —30° C. to 150° C.

2. The process for preparing a compound of the formula

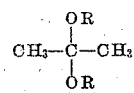

wherein R is an alkyl radical which comprises reacting allene with an alkyl monohydric alcohol having 1–10 carbon atoms in the presence of a catalyst comprised of a boron fluoride and mercuric oxide at a temperature of —30° C. to 150° C.

3. The process for preparing 2,2-dialkoxypropanes which comprises reacting allene with a lower alkyl monohydric alcohol having 1–4 carbon atoms in the presence of a catalyst comprised of a boron fluoride and mercuric oxide at a temperature of 0° C. to 75° C.

4. The process for preparing acetone dimethyl acetal which comprises passing a gaseous stream of allene into a reaction zone containing methanol at a temperature of 20° C. to 60° C. in the presence of at least 0.1% by weight of a catalyst based on said methanol comprised of a boron fluoride and mercuric oxide.

5. The process for preparing acetone di-n-butyl acetal which comprises passing a gaseous stream of allene into a reaction zone containing n-butanol at a temperature of 20° C. to 60° C. in the presence of at least 0.1% by weight of a catalyst based on said n-butanol comprised of a boron fluoride and mercuric oxide.

References Cited in the file of this patent

UNITED STATES PATENTS 2,140,713 Nieuwland et al.  Dec. 20, 1938

OTHER REFERENCES

Carothers et al.: Jour. Amer. Chem. Soc., vol. 55 (1933), pp. 786-787.

UNITED STATES PATENT OFFICE

CERTIFICATE OF CORRECTION

Patent No. 2,875,252                                    February 24, 1959

Edward U. Elam et al.

It is hereby certified that error appears in the printed specification of the above numbered patent requiring correction and that the said Letters Patent should read as corrected below.

Column 1, line 35, for "on alcohols" read -- of alcohols --; column 2, line 23, for "alcohols are" read -- alcohols or --; column 3, line 68, for "50 ml." read -- 500 ml. --; column 4, line 5, for "produce" read -- product --.

Signed and sealed this 28th day of July 1959.

(SEAL)

Attest:

KARL H. AXLINE                                             ROBERT C. WATSON

Attesting Officer                                    Commissioner of Patents